UNITED STATES PATENT OFFICE 2,390,165

IMINE CONDENSATION PROCESS

Ludwig Orthner, Wilhelm Luce, and Georg Wagner, Frankfort-on-the-Main, Germany; vested in the Alien Property Custodian No Drawing. Application March 29, 1943, Serial No. 481,014. In Germany November 7, 1940

5 Claims. (Cl. 260—239)

The present invention relates to a method of preparing organic compounds containing nitrogen and it particularly relates to urea or carbamic acid ester derivatives. It is an object of our new method to manufacture compounds of the general formula:

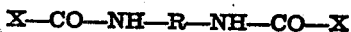

wherein R means an aliphatic or isocyclic radical and X stands for the radical of an amine or an alcohol or a phenol, by condensing in the presence of alkali N,N'-dichloramides of dicarboxylic acids with amines, alcohols or phenols. By the term alkali not only sodium and potassium hydroxide and others are to be understood, but also the oxides of alkaline earth metals, such as calcium oxide.

A further object of the present invention is a method of manufacturing compounds of the general formula:

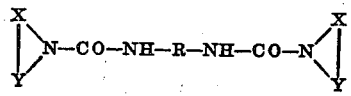

wherein R stands for a radical as identified above and

means an alkylene group bound to nitrogen in alpha, beta-position, by using as amines for the condensation with dichloramides alpha-beta-alkylene imines. The said dialkylene ureas may also be obtained by condensing di-isocyanates with alpha-beta-alkylene imines. Di-isocyanates may be prepared from phosgene and the corresponding diamines which in some cases are difficult to be obtained and are not available on a commercial scale. In our new process N,N'-dichloramides of dicarboxylic acids are used as starting materials which may easily be prepared by chlorination of dicarboxylic diamides. In the reaction which probably proceeds according to the following scheme

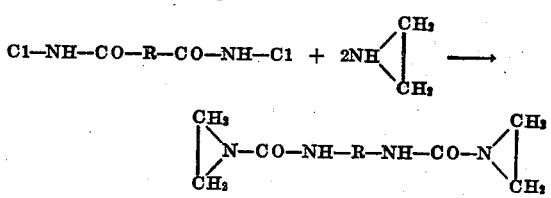

rearrangement of carbon and nitrogen atoms occurs in a similar way as is known from the Hofmann reaction which consists in preparing amines from halogen amines in the presence of alkali=

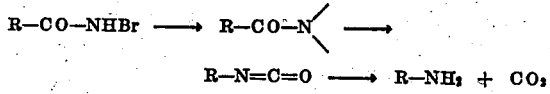

$$R-N=C=O \longrightarrow R-NH_2 + CO_2$$

In the present process, however, no amine, but urea or carbamic ester derivatives are formed in a pure form and with a good yield.

The new process may be carried out in inert solvents; but it is also possible to perform the reaction in an aqueous medium. In that case it is advisable to use the N,N'-dichlorodiamides directly in the moist state, and therefore it is not necessary to dry the N,N'-dichlorodiamides sensitive to high temperatures.

As N,N'-dichlorodiamides of dicarboxylic acids there may, for instance, be named the derivatives of aliphatic dicarboxylic acids, such as adipic acid or sebacic acid, furthermore methyladipic acid, pimelic acid, suberic acid, azelaic acid, or dicarboxylic acids, the carbon chain of which is interrupted by hetero atoms or hetero atom groups, such as diglycolic acid. There may also be started from dichlorodiamides of aromatic, aromatic-aliphatic or cycloaliphatic dicarboxylic acids, for instance from terephthalic acid dichlorodiamide. Further suitable dicarboxylic acids of these series are isophthalic acid, diphenyl-4.4'-dicarboxylic acid, diphenylmethane-4.4'-dicarboxylic acid, para-phenylene-diacetic acid, homoterephthalic acid, as well as the hydrogenation products of said acids, for instance hexahydroterephthalic acid. As amines and alcohols or phenols there may be named: ammonia, methylamine, butylamine, ethylene imine and other alpha,beta-alkylene imines wherein the cyclically bound ethylene group is substituted by hydrocarbon radicals, such as methyl, propyl, butyl, amyl, decyl, phenyl, benzyl; furthermore aniline, methylaniline, benzylamine, higher aliphatic amines, methanol, ethanol, butanol, cyclohexanol, benzyl alcohol, higher aliphatic alcohols, phenol, cresol, xylenol, butyl-phenols and other alkyl-phenols.

The condensation products obtained may be used for various purposes, for instance in the field of synthetic resins or in the textile and leather industries.

The following examples serve to illustrate the invention, but they are not intended to limit it thereto, the parts being by weight, if not stated otherwise:

1. 11 grams of adipic acid-N,N'-dichlorodiamide are introduced, while cooling and stirring, at a temperature between 10° C. and 15° C., into a solution of 2.4 grams of sodium in 50 cc. of butanol and the whole is further stirred for about 10 hours at said temperature. In the course of this period the dicarbamic acid ester formed of the formula:

C₄H₉—O—CO—NH—(CH₂)₄—NH—CO—O—C₄H₉ separates. The reaction mixture is neutralized with a small portion of acetic acid, filtered with suction, thoroughly washed with water and dried. The yield amounts to 7 grams of 1.4-N.N'-butane-dicarbamic acid butyl ester melting at 96° C.–99° C. The product is insoluble in water and readily soluble in methanol.

2. A solution of 25 grams of solid sodium hydroxide in 300 cc. of methanol is mixed at a temperature between 10° C. and 15° C., while stirring, with a solution of 55 grams of adipic acid-N.N'-dichlorodiamide in 600 cc. of methanol and the mixture is allowed to stand at 10° C.–15° C. After about 6 hours the mixture is worked up by neutralizing it with a small portion of acetic acid, freeing it, under reduced pressure, from the excess of methanol and extracting the solid residue with methylene chloride. The methylene chloride is distilled and the 1.4-N.N'-butane-dicarbamino acid methyl ester remains as a white, solid mass. The yield amounts to 47 grams. The product melts at 130° C.–133° C.; it is soluble in water.

3. Into a suspension of 11 grams of adipic acid-N.N'-dichlorodiamide in 20 grams of water there are added first a solution of 7.3 grams of butylamine in 10 grams of water and then 9 cc. of caustic soda solution of 33 per cent strength; care has to be taken that the temperature of the mixture does not exceed room temperature, this being attained by cooling the vessel from outside. At the beginning of the reaction a clear solution is formed from which there separates, by and by, the 1.4-N.N'-butane-N''.N'''-dibutyl-diuera of the formula:

C₄H₉.NH.CO.NH.(CH₂)₄.NH.CO.NH.C₄H₉

After filtering, washing with water and drying, 14 grams of diurea are obtained. The product melts at 207° C.–209° C.

4. 269 grams of sebacic acid dichlorodiamide are stirred into a solution kept at —5° C. and consisting of 80 parts of caustic soda in 2000 parts of water and 86 parts of ethylene imine. As soon as the dichlorodiamide has completely dissolved, the temperature is carefully raised to 20° C. and this temperature is maintained by cooling until an evolution of heat can no longer be noticed. The ethylene urea which has precipitated is filtered with suction and washed with a small portion of water. In order to obtain the product in the anhydrous state, free from inorganic salts, it is dissolved in methylene chloride. The solution of methylene chloride is dried with potassium carbonate and the methylene chloride is distilled. As a residue from distillation there are obtained 211 parts of the N.N-ethylene-N'''.N'''-ethylene-1.8-N'.N''-diureido-n-octane free from salt and corresponding to the formula:

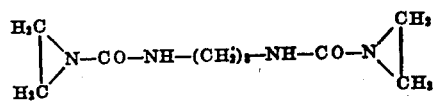

The product readily dissolves in hot water, but sparingly dissolves in cold water. It melts at 106° C.–107° C.

Instead of ethylene imine there may be used propylene imine, whereby the compound of the formula

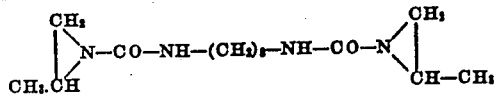

is obtained.

5. 213 parts of adipic acid-N.N'-dichlorodiamide are slowly stirred into a solution heated to 30° C. and consisting of 80 parts of caustic soda, 600 parts of water and 86 parts of ethylene imine. As soon as the whole has dissolved and an evolution of heat can no longer be ascertained, the solution which still has only a very feeble alkaline reaction to phenolphthalein is rendered entirely neutral to phenolphthalein.

The solution containing sodium chloride and having an alkaline reaction to litmus paper may be used for improving fibrous material or for producing coatings resistant to water and rubbing.

If the ethylene urea has to be separated from the aqueous solution of the reaction, 100 parts of caustic soda are added, while cooling, to the solution. The product which has separated, is filtered with suction, washed with a small portion of caustic soda solution of 20 per cent strength and dissolved in methylene chloride. The solution of methylene chloride is dried with potassium carbonate and the methylene chloride is distilled under reduced pressure. As a residue from distillation 120 parts of N.N-ethylene-N'''.N'''-ethylene-1.4-N'.N''-diureido-n-butane of the formula:

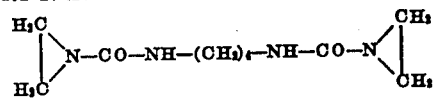

are obtained. The product readily dissolves in water, but sparingly dissolves in caustic soda solution. It melts at 120° C. By crystallization from acetone it may, if required, be further purified.

By using, instead of adipic acid-N.N'-dichlorodiamide, the corresponding dichlorodiamide from methyl-adipic acid, there is obtained a solution of N.N-ethylene-N'''.N'''-ethylene-1.4-N'.N''-diureido-2-methyl-n-butane of the formula:

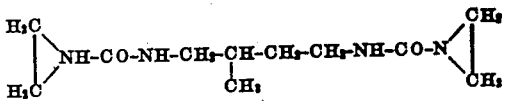

The solution may be employed in the same manner as the solution obtained from adipic acid-N.N'-dichlorodiamide. By the addition of caustic soda solution the ethylene urea may be precipitated from the solution in the form of an oil.

By using propylene imine, instead of ethylene imine, the corresponding propylene derivatives are obtained.

6. 213 parts of adipic acid-N.N'-dichlorodiamide are slowly stirred into a solution kept at —3° C. and consisting of 80 parts of caustic soda in 600 parts of water. After the dichlorodiamide has been dissolved, 86 parts of ethylene-imine are added and the temperature is allowed to raise to 30° C. At this temperature the reaction occurs rather rapidly with a considerable evolution of heat. Care must, therefore, be taken by well cooling, that this temperature is not exceeded and the reaction does not become too violent. At 30° C. the rearrangement is complete in about 2 hours.

The solution may be used as such or it may be further treated as it is described in Example 5.

7. 500 parts of an aqueous paste of adipic acid-N.N'-dichlorodiamide containing 213 parts of dichlorodiamide are stirred into a suspension kept at −3° C. and consisting of 80 parts of calcium oxide in 1300 parts of water and 86 parts of ethylene imine. After the dichlorodiamide has been dissolved, the solution is heated to 30° C., as it is described in Example 6. When the reaction is complete the excess of calcium oxide is separated by filtration and the solution obtained is used as it is described in the preceding examples.

8. 233 parts of terephthalic acid-N.N'-dichlorodiamide are stirred into a solution kept at −5° C. and consisting of 80 parts of caustic soda in 1000 parts of water and 86 parts of ethylene imine. The mixture is carefully heated to 30° C., while continuously stirring, until the evolution of heat has ceased and the mixture has become nearly neutral. The yellowish product which has separated is filtered with suction and washed with water. There are thus obtained 212 parts (=86 per cent of the theoretical yield) of N.N-ethylene-N'''.N'''-ethylene-1.4-N'.N''-diureidobenzene of the formula:

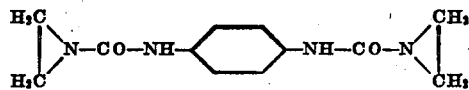

The ethylene urea obtained is sparingly soluble in hot and cold water and in the usual indifferent organic solvents. It melts at 290° C. with decomposition.

We claim:

1. The process of preparing compounds of the general formula:

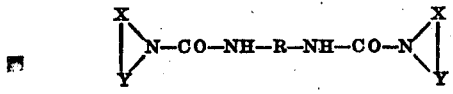

wherein R is a radical of the group consisting of aliphatic and isocyclic radicals and $$\frac{X}{Y}$$

means an alkylene group bound to nitrogen in alpha-beta-position, which comprises condensing in the presence of alkali N,N'-dichloramides of dicarboxylic acids with alpha, beta-alkylene imines.

2. The process of preparing compounds of the general formula:

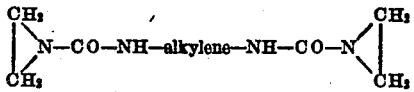

which comprises condensing in the presence of alkali N,N'-dichloramides of aliphatic dicarboxylic acids with ethylene imine.

3. The process of preparing the compound of the general formula:

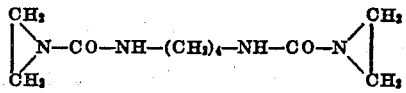

which comprises condensing in the presence of alkali the N,N'-dichloramides of adipic acid with ethylene imine.

4. The process of preparing the compound of the general formula:

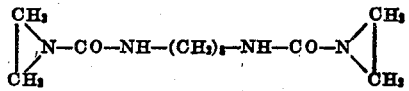

which comprises condensing in the presence of alkali the N,N'-dichloramides of sebacic acid with ethylene imine.

5. The process of preparing the compound of the general formula:

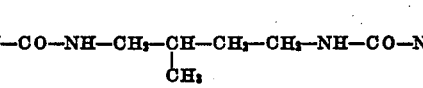

which comprises condensing in the presence of alkali the N,N'-dichloramides of methyladipic acid with ethylene imine.

LUDWIG ORTHNER.
WILHELM LUCE.
GEORG WAGNER.